(12) United States Patent
Harris et al.

(10) Patent No.: US 6,725,501 B2
(45) Date of Patent: Apr. 27, 2004

(54) CASTER WITH UNIVERSAL MOUNT AND SWIVEL AND WHEEL LOCK

(75) Inventors: Charles A. Harris, Evansville, IN (US); Nick L. Schnarr, Evansville, IN (US)

(73) Assignee: FKI Industries, Inc., Fairfield, CT (US)

( * ) Notice: Subject to any disclaimer, the term of this patent is extended or adjusted under 35 U.S.C. 154(b) by 0 days.

(21) Appl. No.: 10/210,451

(22) Filed: Jul. 31, 2002

(65) Prior Publication Data

US 2004/0020008 A1 Feb. 5, 2004

(51) Int. Cl.⁷ .............................................. B60B 33/00
(52) U.S. Cl. ....................... 16/35 R; 16/31 R; 16/31 A; 16/40
(58) Field of Search ................ 16/35 R, 31 R, 16/31 A, 40; 180/1.12; 108/177, 189; 280/47.38, 642, 647, 650

(56) References Cited

U.S. PATENT DOCUMENTS

| | | | |
|---|---|---|---|
| 559,334 A | | 4/1896 | Johnson et al. |
| 1,731,312 A | | 10/1929 | Matheson |
| 2,138,433 A | * | 11/1938 | Sunden ...................... 16/35 D |
| 2,544,924 A | * | 3/1951 | Herold ....................... 105/170 |
| 2,972,163 A | * | 2/1961 | Ross et al. .................. 16/35 R |
| 3,486,185 A | | 12/1969 | Lange |
| 3,571,842 A | | 3/1971 | Fricke |
| 3,755,852 A | | 9/1973 | Greene |
| 3,828,392 A | | 8/1974 | Bolger |
| 3,858,271 A | | 1/1975 | Howard et al. |
| 3,881,216 A | | 5/1975 | Fontana |
| 4,035,864 A | | 7/1977 | Schroder |
| 4,037,292 A | | 7/1977 | Lapham |
| 4,069,543 A | | 1/1978 | James |
| 4,205,413 A | * | 6/1980 | Collignon et al. .......... 16/35 D |
| 4,349,937 A | | 9/1982 | Fontana |
| 4,449,268 A | | 5/1984 | Schnuell |
| 4,509,227 A | | 4/1985 | Keane |
| 4,649,596 A | * | 3/1987 | Kassai ........................ 16/35 R |
| 4,658,466 A | * | 4/1987 | Vollberg et al. ............ 16/35 R |
| 4,667,366 A | | 5/1987 | Melara |
| 4,706,328 A | * | 11/1987 | Broeske ...................... 16/35 R |
| 4,720,894 A | | 1/1988 | Deasy et al. |
| 4,793,021 A | | 12/1988 | Deasy et al. |
| 4,805,260 A | | 2/1989 | Tooth |
| 4,835,815 A | * | 6/1989 | Mellwig et al. ............ 16/35 R |
| 4,870,715 A | | 10/1989 | Schnuell |
| 4,941,552 A | * | 7/1990 | Screen ....................... 188/1.12 |
| 5,052,075 A | | 10/1991 | Harris |

(List continued on next page.)

FOREIGN PATENT DOCUMENTS

| | | |
|---|---|---|
| EP | 0562923 | 9/1993 |
| GB | 24557 | of 1894 |
| GB | 6562 | of 1897 |
| GB | 945829 | 1/1964 |
| GB | 2147802 | 5/1985 |
| JP | 356034505 A | 4/1981 |
| JP | 5-50805 | 3/1993 |
| JP | 2001-277806 A * | 10/2001 |

*Primary Examiner*—Chuck Y. Mah
(74) *Attorney, Agent, or Firm*—Woodard, Emhardt, Moriarty, McNett & Henry LLP

(57) ABSTRACT

A swivel caster assembly has a molded plastic caster horn with an upwardly opening socket receiving a connector stem, the portion thereof above the caster horn having either a plate, a threaded post, or a smooth post with a retaining ring, for connection to an object to be supported by the caster. The caster horn and the received stem portions of the various connectors are the same, so the same horn can receive any type of connector. The horn is shaped to receive locking features for wheel, swivel, both wheel and swivel, or simply a snap-in cover where no locking feature is desired.

26 Claims, 10 Drawing Sheets

U.S. PATENT DOCUMENTS

| | | | |
|---|---|---|---|
| 5,119,525 A | | 6/1992 | Melara |
| 5,191,675 A | | 3/1993 | Ishikura |
| 5,199,131 A | | 4/1993 | Harris |
| 5,234,226 A | | 8/1993 | Liu |
| 5,236,066 A | * | 8/1993 | O'Neal et al. .............. 188/1.12 |
| 5,263,226 A | | 11/1993 | Roy et al. |
| 5,328,000 A | * | 7/1994 | Rutter et al. ................ 188/1.12 |
| 5,351,927 A | | 10/1994 | Howell |
| 5,361,454 A | | 11/1994 | Sumser et al. |
| 5,377,372 A | | 1/1995 | Rudolf et al. |
| 5,390,393 A | * | 2/1995 | Reppert et al. ................. 16/21 |
| 5,568,671 A | | 10/1996 | Harris et al. |
| 5,675,864 A | | 10/1997 | Chou |
| 5,727,284 A | | 3/1998 | Deutsch |
| 5,774,936 A | | 7/1998 | Vetter |
| 5,799,366 A | | 9/1998 | Zocco et al. |
| 5,967,535 A | | 10/1999 | King |
| 6,024,416 A | | 2/2000 | Chen et al. |
| 6,212,863 B1 | | 4/2001 | Thomas |
| 6,219,881 B1 | | 4/2001 | Wen |
| 6,286,184 B1 | * | 9/2001 | Dean et al. .................. 16/35 R |
| 6,360,851 B1 | | 3/2002 | Yang |

* cited by examiner

CASTER WITH UNIVERSAL MOUNT AND SWIVEL AND WHEEL LOCK

BACKGROUND OF THE INVENTION

Swiveling caster assemblies are well known and widely used. Some such caster assemblies have devices to lock the caster wheel, when desired, to prevent inadvertent rolling movement after the supported object has been parked in a desired location. Some of them also have devices to disable the swivel feature to prevent swiveling of the caster relative to the object when the object is parked. Some have a combination of swivel lock and wheel lock features.

Swiveling casters are also provided with various arrangements for mounting to the object to be supported. One type of mount that is widely used is a plate having holes through it to receive fasteners for attaching it to the bottom of the object to be supported. A bearing structure is provided between the plate and the caster horn. Another type of mount is a stem fastened to the caster horn and projecting upward from the caster horn and received in a downwardly opening socket in the object supported. One version of this approach has a resilient metal split ring received in a groove in the stem and engaging a wall of the socket and frictionally retaining the stem in the socket. But there is sufficient space between the ring and the groove for the stem to rotate in the socket and enable the stem, and thereby the caster, to swivel in the socket. Another type of mount is a threaded stem which is screwed into a socket in the object to be supported and which has features at the lower end for reception in a socket in the caster horn or for mounting through a ball bearing assembly to the caster horn.

In addition to the above-mentioned possibilities for various combinations of features, aesthetic considerations have increasing importance for some markets. Color variety and avoidance of appearance-compromising rust and tarnish have led to adoption of plastics in some instances. Customers can require certain colors.

It occurs to us that, because of the wide variety of features and combinations of features that customers of caster manufacturers might want, it would be desirable to have a basic caster assembly which is easily adapted to various customer requirements. The present invention is addressed to assisting a caster manufacturer to successfully address one or more of the aforementioned possible customer desires.

SUMMARY OF THE INVENTION

Described briefly, according to a typical embodiment of the present invention, a caster assembly is provided with a caster horn with an upwardly opening special receiver therein configured to receive a special stem configured according to the invention for mounting to various types of objects to be supported by such casters. Various mounting devices are provided, all of them with the special stem for reception in the special receiver. One embodiment of mounting device is a plate having the special stem embedded in it and projecting downward from it. Another embodiment is an upward projection from the special stem and which has a groove with a split ring for snap-in connection into a socket in the object to be supported. Another embodiment is an upward projection of the special stem and which is threaded to be screwed into a socket in an object to be supported. The special stem and receiver have a cooperating snap-in feature whereby the stem is retained in the receiver of the horn, once installed with the horn.

The horn according to the invention has a slot for reception of either a snap-in cover if there is to be no lock assembly, or for installation of a brake operating lever if the caster assembly is to have a wheel lock, a swivel lock, or a combination of wheel and swivel lock. The caster horn and either the cover or the brake operating lever, as the case may be, are made of molded plastic.

BRIEF DESCRIPTION OF THE ILLUSTRATED EMBODIMENTS

DESCRIPTION OF THE ILLUSTRATED EMBODIMENTS

Figure 1:
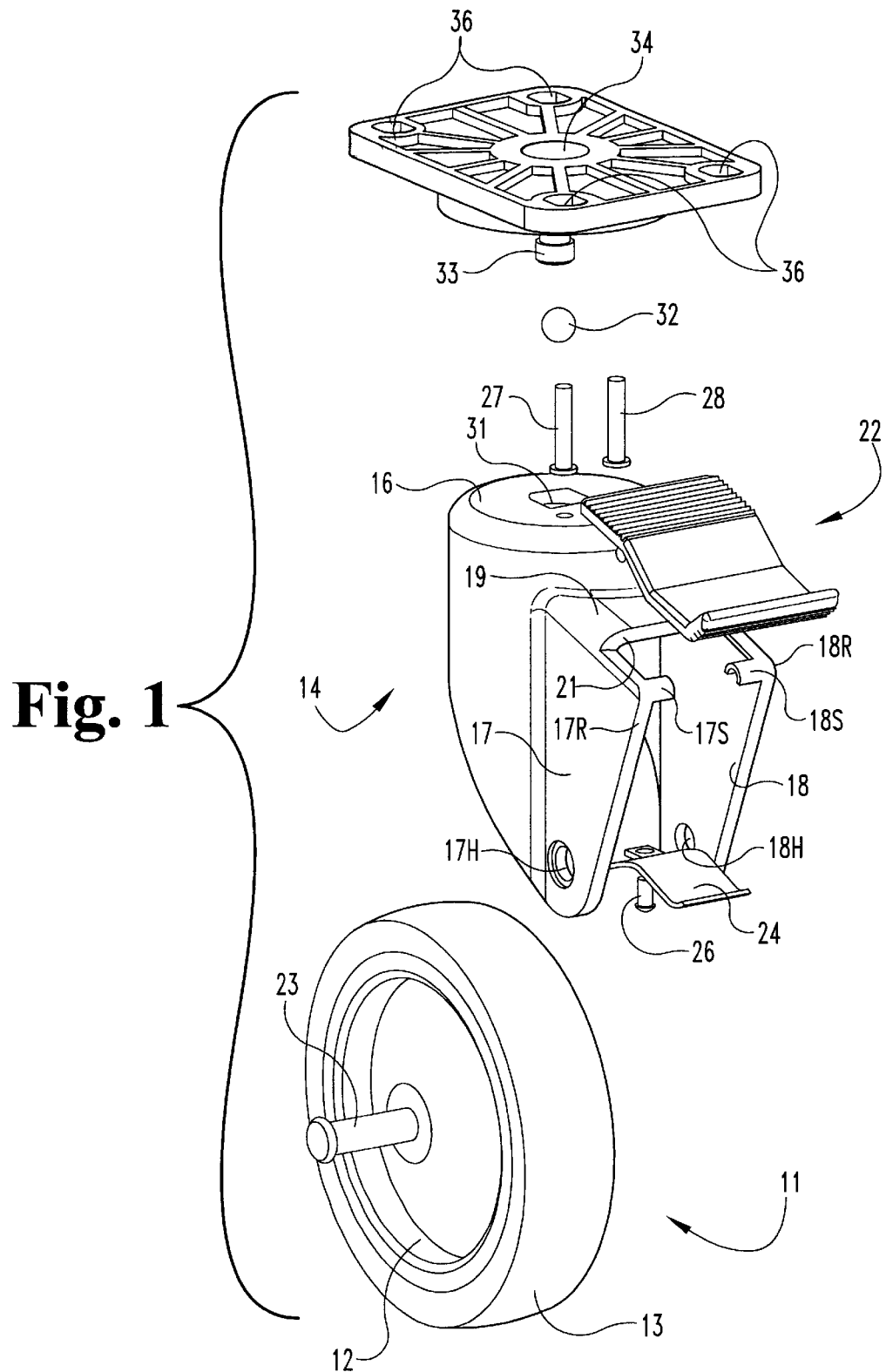
FIG. 1 is an exploded perspective view of a caster assembly according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figures 2, 3:
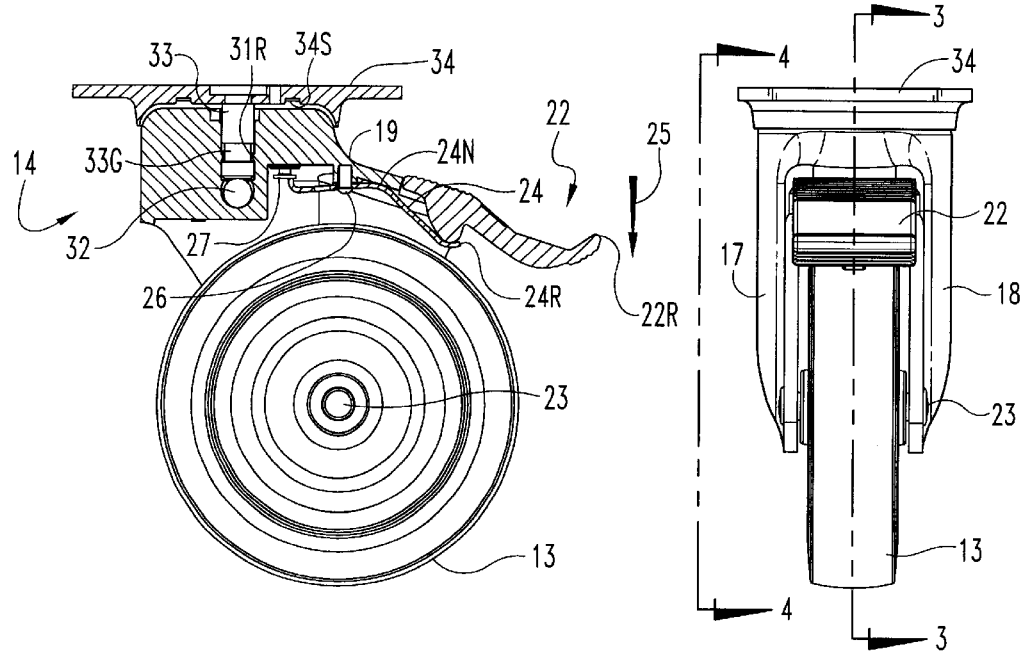
FIG. 2 is a rear elevational view thereof.
FIG. 3 is a section (except for the wheel) taken at line 3—3 in FIG. 2 and viewed in the direction of the arrows.

Referring first to FIGS. 1–3, the illustrated caster assembly includes a wheel assembly 11 including a core portion 12 and tread portion 13. This is received in a horn 14 which, in the illustrated embodiment, has a top 16 and two horizontally spaced legs 17 and 18. In the illustrated embodiments, the top has a portion which bridges the space between the legs and steps downward to a portion 19, having a rear edge 21 located forward of the rear edges 17R and 18R of the legs 17 and 18. Pivot sockets 17S and 18S project inwardly from the upper rear corners of the legs 17 and 18. While all embodiments use the same horn and wheel, it should be understood that the terms "horn" and "wheel" when used in the claims, should not be construed as limited to a two legged horn or a wheel having core and tread of different materials or shapes, as the invention is quite applicable to other types of "wheel" construction and "horn" configuration.

Additional components shown in FIG. 1 and to be described in more detail later, include a wheel rivet 23 for mounting the wheel in the yoke between the horn legs 17 and 18 as the rivet is received through the holes 17H and 18H in the bottom rear portion of the legs 17 and 18. A lever operated locking spring 24 is secured by anchor screw 26 to the underside of the portion 19 of the horn bridging the space between the legs. Swivel locking pins 27 and 28 are receivable upward through a couple of apertures in the top of the horn.

An upwardly opening socket 31 in the top of the horn receives a bearing ball 32 and a downwardly projecting stem 33 molded into the top plate 34 which can be mounted to whatever object is to be supported by the caster assembly. One example of mounting can be done by screws (not shown) through the four corner holes 36 in the top plate. All of the components described to this point may be made of molded plastics, with a few possible exceptions such as mounting screws, axle 23, spring 24, screw 26, pins 27 and 28, and stem 33, some or all of which a manufacturer might prefer to make of metal.

Figure 9:
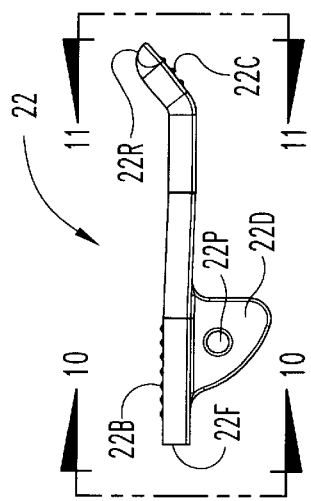
FIG. 9 is a side elevational view of the brake operating lever.
Figure 10:
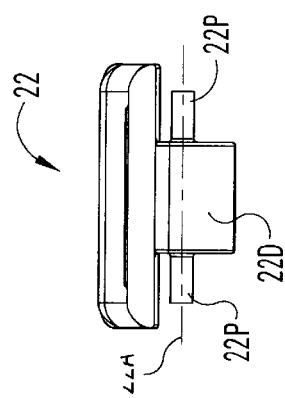
FIG. 10 is a front elevational view thereof.

The nature of the mounting of the brake operating lever 22 on the caster assembly can be readily understood with the help of reference to FIGS. 9 through 13. The lever 22 is generally rectangular when viewed from the top as in FIG. 13, and has a front edge 22F and a rear edge 22R. The rear portion of the lever is turned upwardly as shown in FIG. 9. The top surface has ribbing 22B on top adjacent the front edge 22F and ribbing 22C on the bottom of the upturned portion near the rear edge 22R. A cam body 22D projects downwardly from the bottom of the lever near the front end 22F. This cam has two pivot posts 22P projecting laterally from the cam body in opposite directions but on the same axis 22A.

Figure 5:
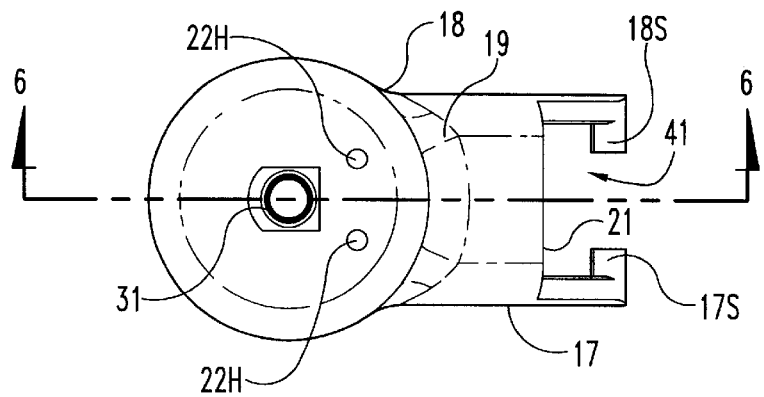
FIG. 5 is a top plan view of the horn portion thereof.
Figure 6:
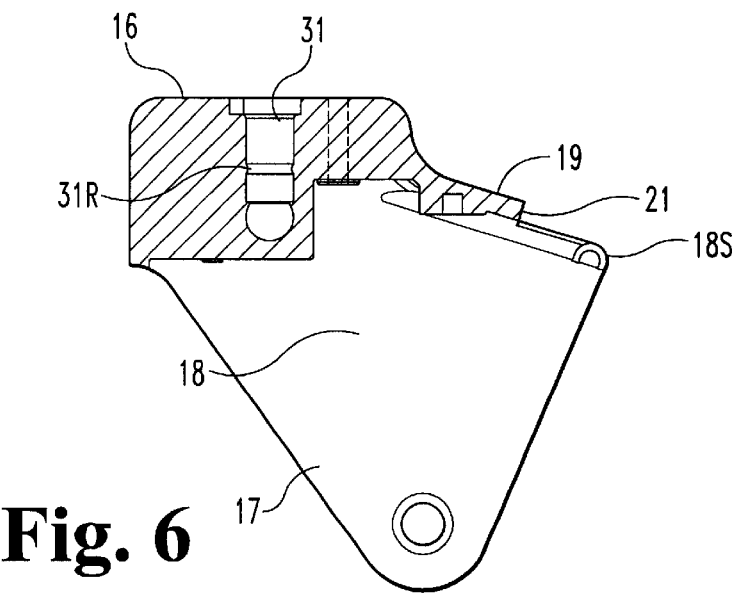
FIG. 6 is a side elevational view of the horn portion with a portion of one horn leg broken away to show interior features.
Figure 7:
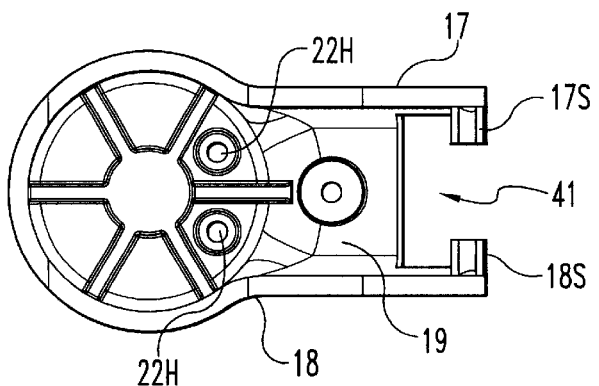
FIG. 7 is a bottom plan view thereof.

The way that the brake operating lever is mounted in the horn can be appreciated upon reference to FIGS. 5, 6 and 7. In the above discussion, it was noted that there are pivot sockets 17S and 18S projecting inward from the legs 17 and 18, respectively, of the horn, and they are rearwardly spaced from the rear of the edge 21 of portion 19 of the horn. FIGS. 6 and 7 show that these sockets are downwardly opening shells. They are sized to receive in them, the pivot posts 22P (FIG. 10) projecting outward from the cam 22D on the bottom of the lever 22. Thus, referring to FIG. 5, the hole or yoke 41 behind edge 21 and in front of the sockets 17S and 18S, is able to receive the cam 22D when the lever is installed in the horn. Since the sockets are only half shells and open at the bottom, pivot posts 22B must be retained in the shells to function properly. Spring 24 shown in FIGS. 14 and 15, serves this function.

Figure 14:
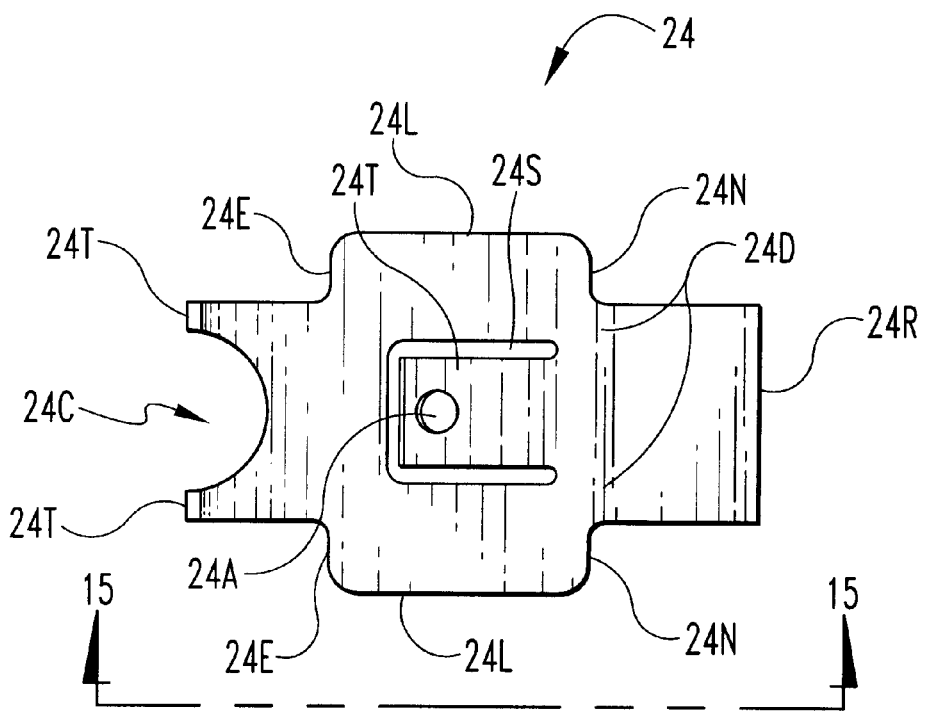
FIG. 14 is a top plan view of the lock spring.
Figure 15:
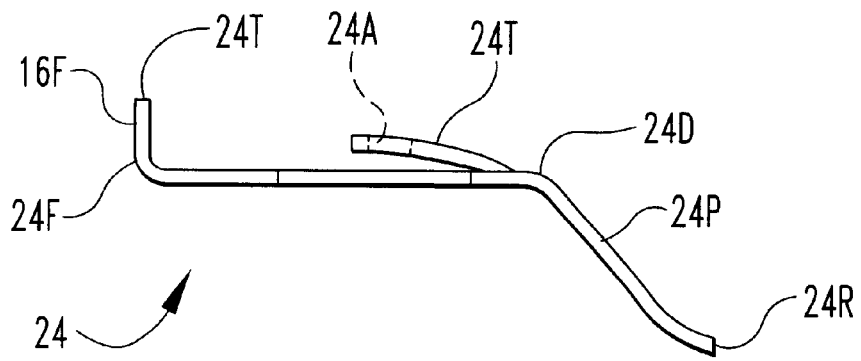
FIG. 15 is a side elevational view thereof.
Figure 16:
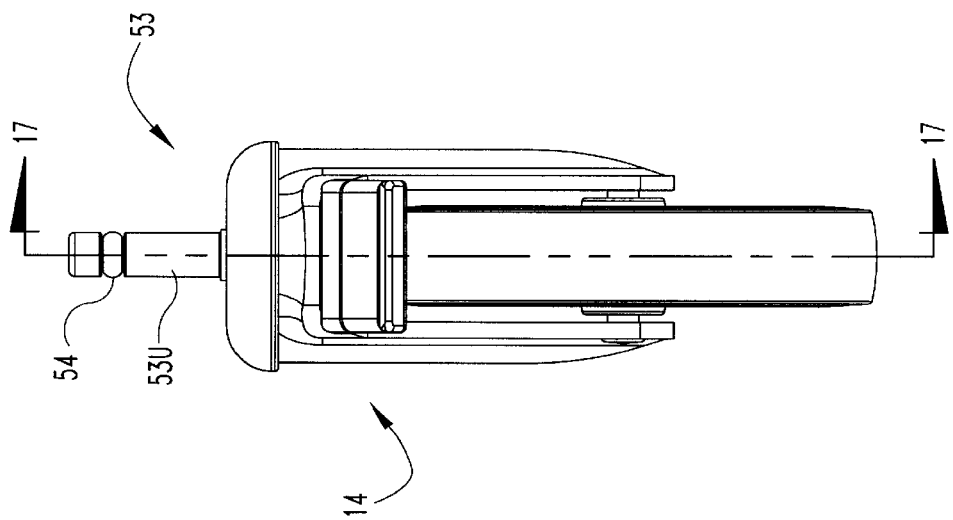
FIG. 16 is a view of the same type as FIG. 2, but showing another embodiment of the caster assembly using a smooth stem with a groove receiving a split ring for swivel connection to the object being supported by the caster assembly, and including the wheel lock but not the swivel lock.
Figure 17:
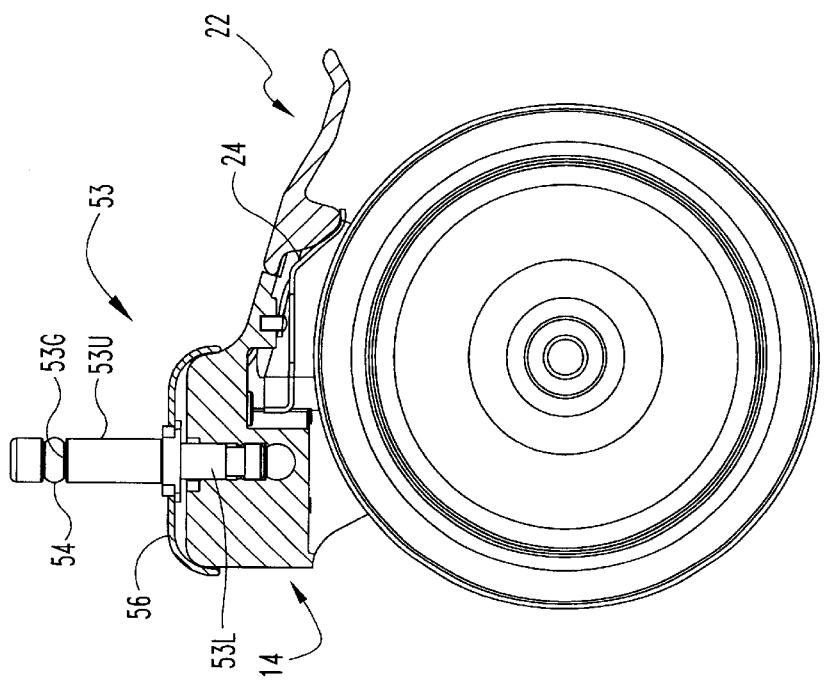
FIG. 17 is a sectional view like FIG. 3, but for the FIG. 17 embodiment.

Referring now to the illustrations of the spring itself as shown in FIGS. 14 and 15, and as an example, spring 24 may be made of spring steel 0.035 inches thick and with a rear portion 24P extending from a rear edge 24R, upward and forward to locations 24D (FIG. 14) where it steps outward and is bent forward (FIG. 15). The wide portion of the spring extends forward from the bends 24D and edges 24N to edges 24E where it steps inward and the width is reduced to the same as at the rear end of the spring. The spring projects forward from the inward step and turns sharply upward at front end 24F. A portion of the spring at the front is cut away at 24C to provide two horizontally spaced tips 24T to engage the bottom, flanged ends of the swivel lock pins 27 and 28.

The spring has a U-shaped slot 24S, the rear edges of which begin adjacent the bends 24D but inboard from the lateral edges of the rear portion 24P of the spring. This slot provides a tab 24T which is a continuation of the upward and forwardly inclined rear portion 24P of the spring but a more gradual turn forward than at the bends 24D. This tab portion has an aperture 24A which receives the anchor screw 26 (FIGS. 1, 3 and 4) by which the spring is secured to the bottom of the portion 19 of the caster horn.

Prior to installation of the spring 24 in the horn, the two swivel locking pins 27 and 28, can be inserted from the bottom upward into guide holes 22H (FIG. 5) in the caster horn. As this is done with the horn upside down, the end flanges on the pins prevent them from falling entirely through the holes. Then the brake operating lever 22 can be placed with the cam 22D received in the yoke 41 at the rear of the horn and the pivot posts 22P received in the sockets 17S and 18S. Then the spring 26 can be installed, fastening it in place with the anchor screw 26. In this fastened condition, the spring is elastically deformed so the rear end portion of the spring resiliently engages the cam surface 22C of the brake operating lever 22, urging it toward the top of the caster horn and thereby urging the pivot pins 22P into the sockets 17S and 18S and securely retaining them in the sockets. The tips 24T of the front end of the spring engage the bottom end faces of the locking pins 27 and 28, retaining them in the holes 22H in the horn.

Referring back to FIGS. 1, 3, 6 and 8, the plate 34 has a built-in stem 33 molded into it, although it could be pressed into the plate after the molding of the plate itself. An end bearing ball 32 is received in the upwardly opening socket 31 of the horn. The stem has a peripheral external groove 33G in it, and the socket wall has an inwardly projecting circular rib at 31R. Therefore, when the stem is pushed into the hole 31, and after the lower end portion of the stem passes the rib 31, the inter-engagement of the rib 31R and the groove 31G prevent the stem and thereby the plate, from being pulled away from the caster horn. At the same time, however, the overall fit of the stem in the horn is not tight, so the horn can swivel readily relative to the plate 34.

Figure 8:
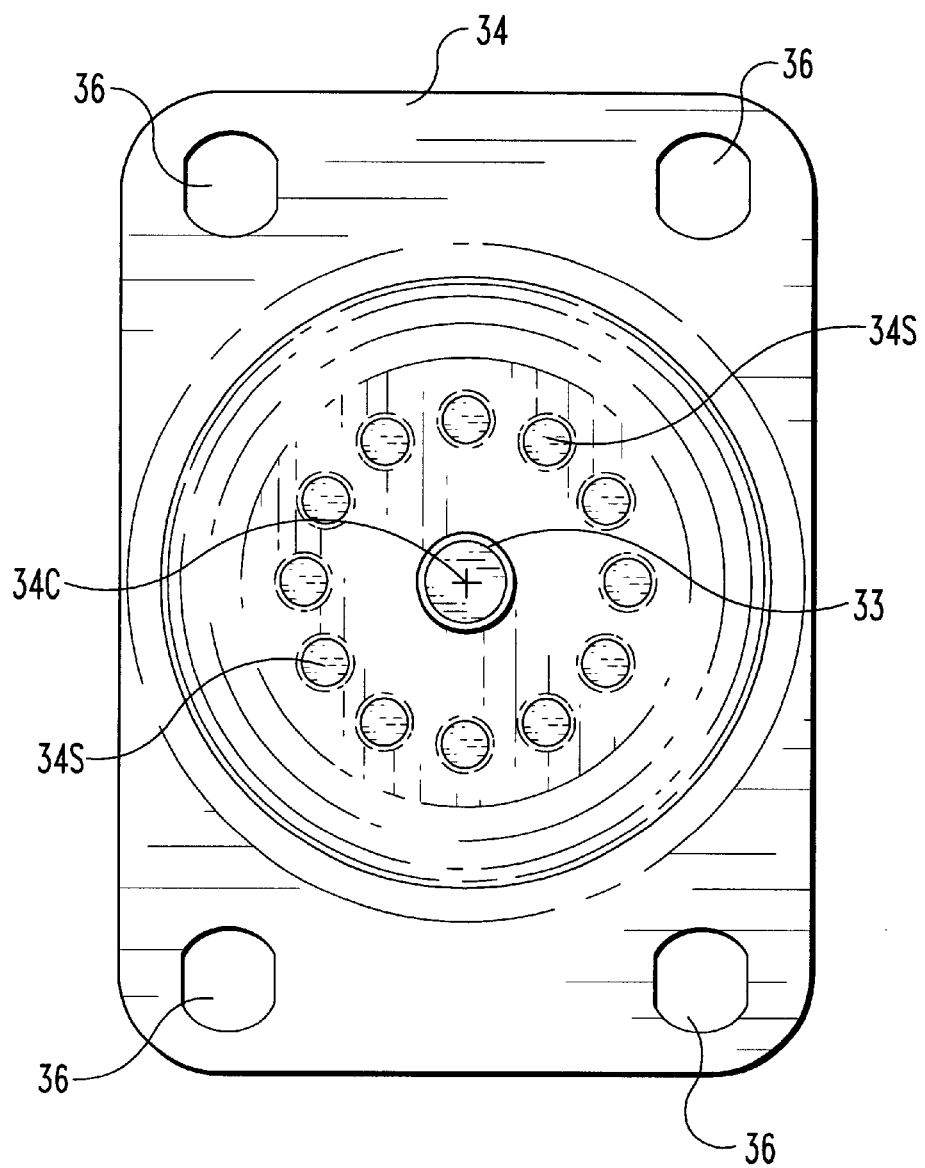
FIG. 8 is a bottom plan view of the top plate of the embodiment shown in FIGS. 1–3.
Figure 12:
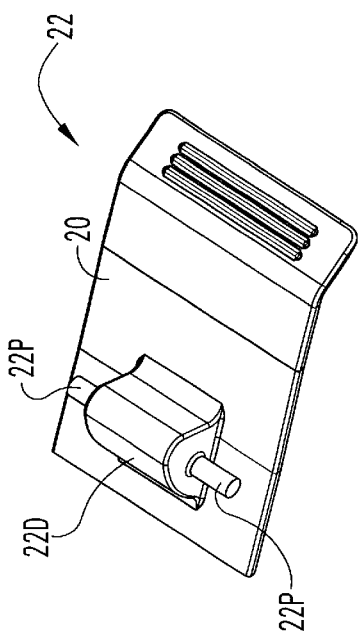
FIG. 12 is a bottom perspective view thereof.
Figure 11:
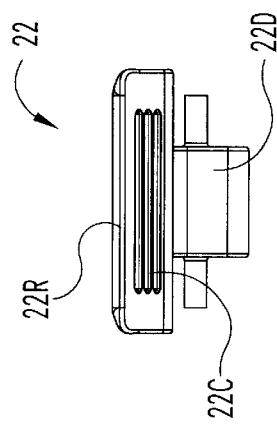
FIG. 11 is a rear elevational view thereof.
Figure 13:
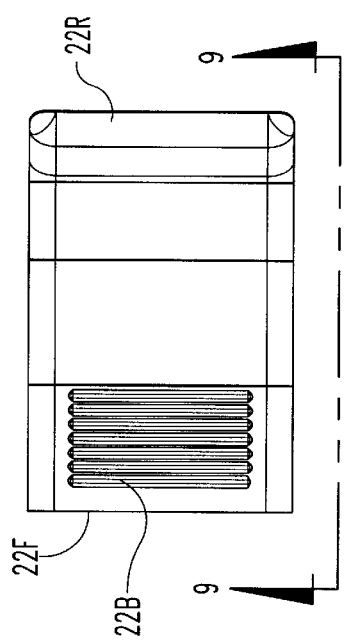
FIG. 13 is a top plan view thereof.

As shown in the bottom view of the plate in FIG. 8, there is an array of twelve sockets 34S circularly spaced around the center 34C of the plate. Accordingly, they are circularly spaced about the axis of the stem 33 which is centered on the plate. The two pin receiver holes 22H are at the same radius from the axis of the stem as are the sockets 34S. Therefore, if the pins are pushed upward in the horn, their ends will enter two of the sockets at a time when the index position of the horn relative to the plate is such as to place any two holes in the plate in registry with the two holes of the horn in which the pins are located.

Figure 4:
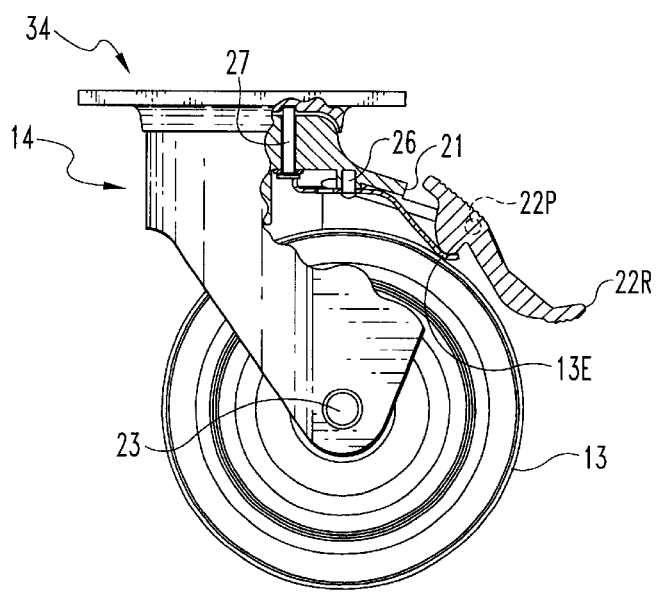
FIG. 4 is a side elevational view taken at line 4—4 in FIG. 2 and viewed in the direction of the arrows, with a portion broken away to show the wheel brake operating lever and swivel lock engaged.

To apply the lock, the operator need only push the distal end portion 22R of the brake lever 22 downward in the direction of arrow 25 (FIG. 3), rocking the lever from its first and stable brake-released position, to its second position thereby engaging the rear end portion of the spring with the tread 13 of the wheel, as shown in FIG. 4. The location of engagement at 13E is forward of the pivot axis of the pivot posts 22P in the sockets 17S and 18S whereby the spring and the resilience of the tire tread urge the brake lever in the clockwise direction 25 about the pivot post axis to provide an "over center" action and retain the brake engaged in a second and stable wheel locking position. Thus the combination provides a bi-stable brake capability.

At the same time that the brake is engaged, the accommodation provided by the U-slot and spring tab 24T while the tab is fixed to the horn, resiliently permits the spring to rock at the rocker bend portion 24D. Therefore, the front end of the spring moves up and thereby the spring tips 24T, engaging the bottom ends of the lock pins 27 and 28, push the pins upward into whatever two sockets 34S in the plate happen to be in registry, or are placed in registry upon minor swiveling of the horn relative to the plate, and thereby lock the horn relative to the plate. So the one action of depressing the distal rear end of the brake operating lever 22 not only prevents the wheel from rolling, but also the horn from swiveling relative to the mounting plate 34. To release the swivel lock and wheel lock, it is only necessary to push down on the ribbed portion 22B at the top front of the lever 22, or pull up the ribbed portion immediately below the rear end 22R of the lever 22.

Figure 23:
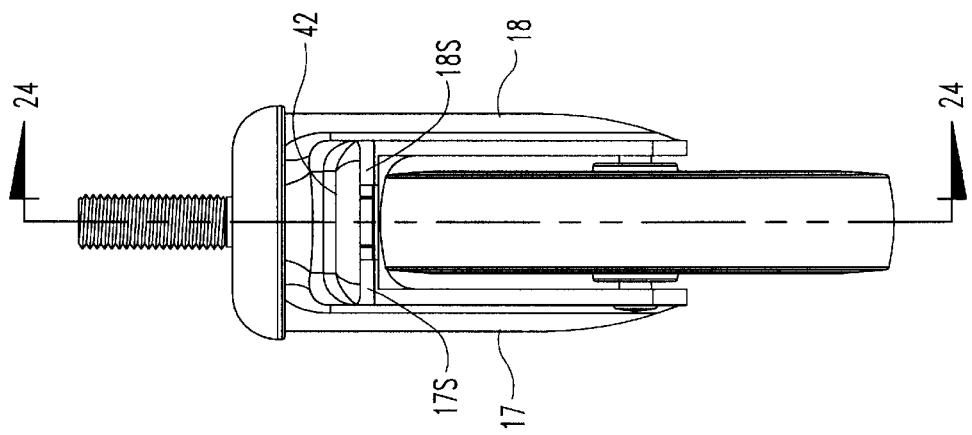
FIG. 23 is a rear elevational view of another embodiment of the invention like that of FIG. 16 but incorporating a threaded swivel stem and omitting the wheel lock and swivel lock.
Figure 24:
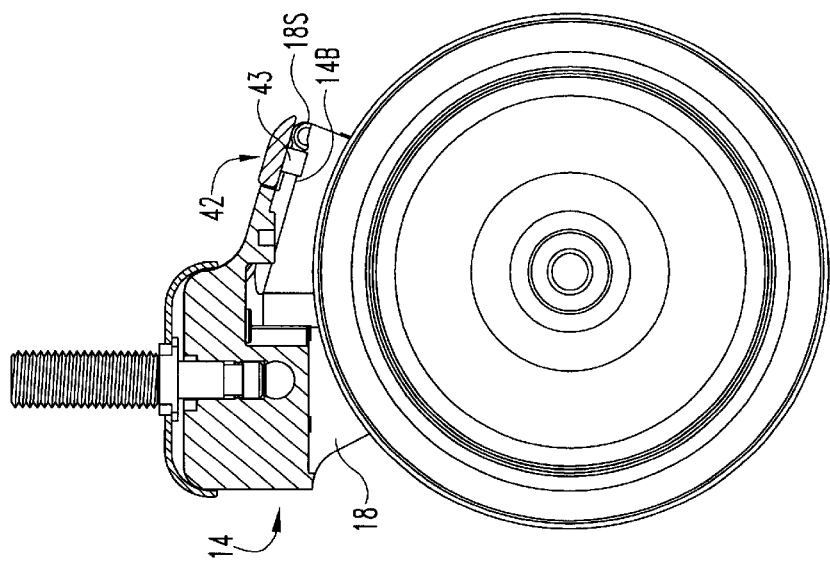
FIG. 24 is a section through the caster assembly of FIG. 23 taken along the lines 24—24 in FIG. 23 and viewed in the direction of the arrows.

Referring now to FIGS. 16 through 19, and 23 and 24, all of these embodiments of the caster assembly, according to the present invention, have exactly the same horn and wheel construction. The only difference between the assembly of FIGS. 18 and 19, and that of FIGS. 2 and 3, is that the wheel lock and swivel lock components of the FIGS. 2 and 3 assembly are omitted in FIGS. 18 and 19, and the yoke opening 41 in the rear of the horn is covered by a snap cover 42. The only difference between the FIGS. 18 and 19 embodiment and that of FIGS. 23 and 24 is that the feature for mounting the caster assembly to the object to be supported by it such as a table or chest or cabinet or the like, is a top threaded stem instead of a top plate with stem. The stem portion received in the top of the horn is exactly the same in all of the illustrated embodiments. The only differences between the FIGS. 16 and 17 embodiment and the FIGS. 2 and 3 embodiment are that the attachment device instead of plate 34, the stem 53 has a smooth surfaced upwardly projecting stem portion 53U with a circular groove 53G receiving a split ring 54 for frictional engagement in a socket in the object to be supported by the caster assembly, and there is no swivel lock. The spring 24 can be the same even if swivel lock pins are absent. The lower portion 53L of the stem received in the horn is exactly the same as in the other embodiments, as the stem receiver in the horn is the same in all of the embodiments.

Figure 18:
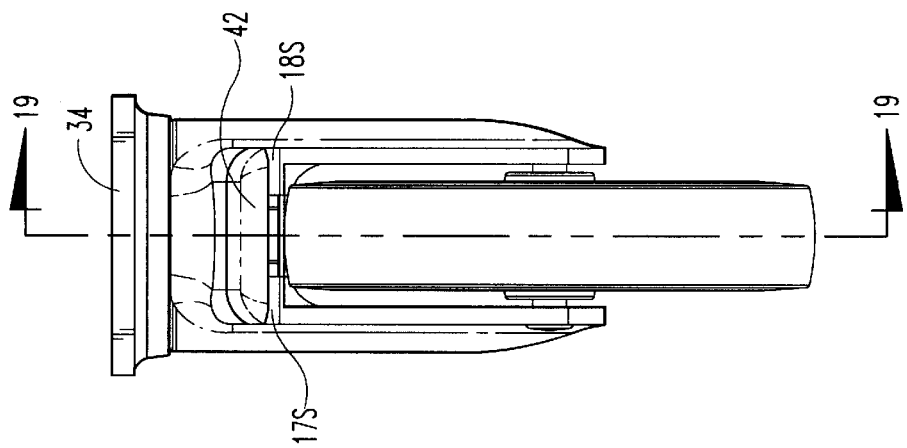
FIG. 18 is a rear elevational view of another embodiment similar to FIG. 2 but omitting the wheel lock and swivel lock features, and incorporating a snap-on cover in place of the brake operating lever of FIG. 2.
Figure 19:
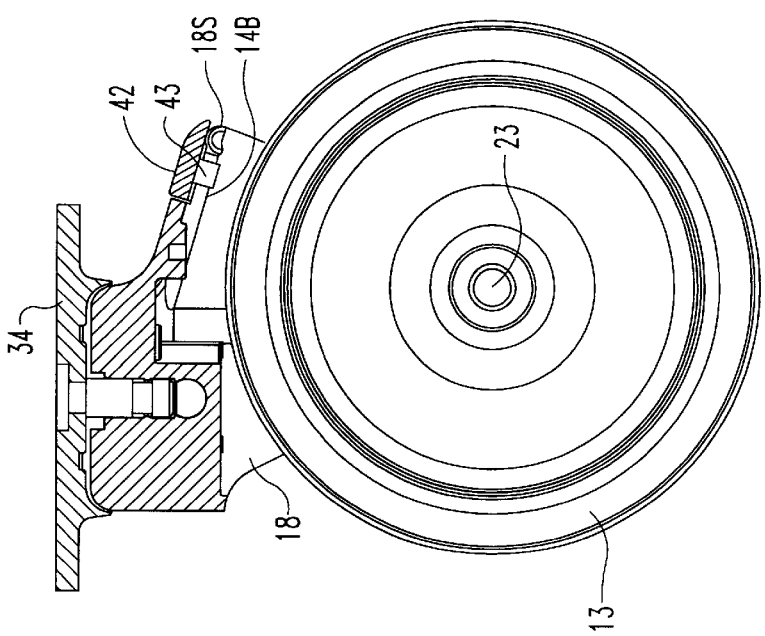
FIG. 19 is a section through the caster assembly taken at line 19—19 in FIG. 18 and viewed in the direction of the arrows.
Figure 22:
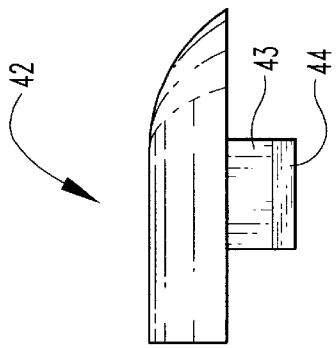
FIG. 22 is a side view of the snap cover.
Figure 20:
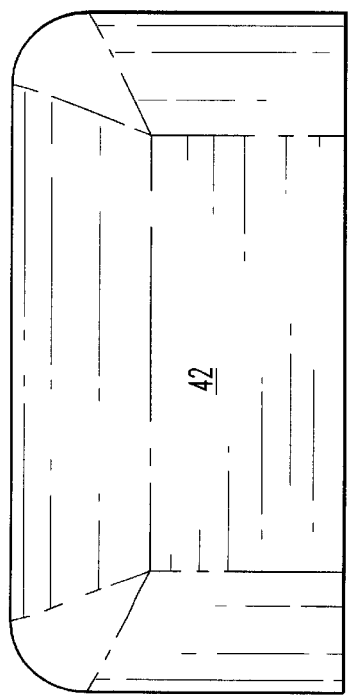
FIG. 20 is a top view of a snap-on cover used in place of the brake operating lever in the casters such as shown in FIGS. 18, 19, 23 and 24.
Figure 21:
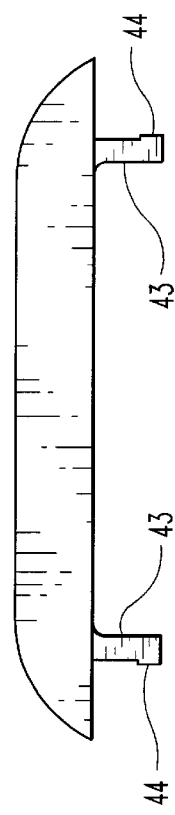
FIG. 21 is a rear view of the snap-on cover.

For the FIGS. 18 and 23 embodiments, the cover 42 is simply pushed into the opening 41. Since the cover is molded plastic, the cover legs 43 are elastically bent in slightly as the flanges 44 thereon are pushed past the sides of opening 41 and then they spring out and hook under edges 14B at each side of opening 41.

The molded plastic parts can be provided in colors and color combinations. While molded plastic has its advantages, metal or other materials might be used. Also, some possible additional embodiments could be contemplated. An example is a combination like in FIG. 23 but omitting the cover, and including the wheel lock or both the wheel lock and swivel lock. Another is a combination like FIG. 16 but with a cover instead of a wheel lock. Therefore, while the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

What is claimed is:

1. A caster assembly comprising:
   a horn having upstanding horizontally-spaced legs, and a top bridging the space between said legs;
   at least one wheel mounted to said horn legs for rotation of said wheel on a first axis;
   a receiver opening upwardly in said horn for receiving a caster swiveling stem, said receiver having a second axis;
   a yoke-shaped opening in said top;
   a means mounted on said horn and covering said yoke opening; and
   said horn and said covering means being made of plastic; and
   said receiver being a socket formed in the plastic of said top of said horn and opening at a top surface of the top of the horn.

2. The assembly of claim 1 and wherein:
   said covering means and said horn have cooperating snap-action fitting surfaces to retain the covering means to the horn.

3. The assembly of claim 1 and wherein:
   said covering means is a brake operating lever having a portion pivoted to the horn.

4. The assembly of claim 3 and further comprising:
   a brake shoe spring having a portion fixed to the horn, with the brake shoe spring having another portion retaining the operating lever pivoted to the horn.

5. The assembly of claim 4 and wherein:
   said brake operating lever has a cam portion engaging said another portion of said brake shoe spring and operable, upon actuation of said lever to force said spring against said wheel and lock said wheel from rotating on said first axis.

6. A caster assembly comprising:
   a horn having upstanding horizontally-spaced legs, and a top bridging the space between said legs:
   at least one wheel mounted to said horn legs for rotation of said wheel on a first axis;
   a receiver opening upwardly in said horn for receiving a caster swiveling stem, said receiver having a second axis;

a yoke-shaped opening in said top;
a means mounted on said horn and covering said yoke opening;
said horn and said covering means being made of plastic;
said covering means is a brake operating lever having a portion pivoted to the horn;
a brake shoe spring having a portion fixed to the horn, with the brake shoe spring having another portion retaining the operating lever pivoted to the horn;
said brake operating lever has a cam portion engaging said another portion of said brake shoe spring and operable, upon actuation of said lever to force said spring against said wheel and lock said wheel from rotating on said first axis;
an aperture in said top;
a swivel lock pin slidably received in said aperture, said lock pin having upper and lower ends;
a portion of said brake shoe spring being engaged with said pin and operable, when said operating lever is actuated enough to lock said wheel, to force said pin upward in said aperture to project said upper end of said pin out through the top of said horn.

7. The assembly of claim 6 and further comprising:
a swivel plate having a stem projecting downwardly and received in said upwardly opening receiver, said stem having an axis colinear with said second axis when said stem is in said receiver and cooperating with said receiver to provide a swivel axis;
a plurality of lock pin receivers in said plate and circularly spaced around the swivel axis, at least one of said lock pin receivers being engageable by said lock pin when projecting out from the top of said horn to thereby abuttingly engage a portion of said plate and prevent swiveling of said horn relative to said plate when said wheel is locked, thereby preventing rolling of said wheel and swiveling of said wheel and horn relative to said plate.

8. The assembly of claim 7 and further comprising:
at least one additional aperture through said horn;
a second swivel lock pin slidably received in said additional aperture;
a pair of prongs on said brake shoe spring, one of said prongs engaging one of said pins and the other of said prongs engaging the other of said pins whereby, when said brake operating lever is actuated to lock said wheel, both of said pins are forced upwardly to project upper ends of said pins above the top of said horn for engagement with said receivers in said plate to prevent swiveling of said horn relative to said plate.

9. A caster assembly comprising:
a horn having upstanding horizontally-spaced legs, and a top bridging the space between said legs;
at least one wheel mounted to said horn legs for rotation of said wheel on a first axis;
a receiver opening upwardly in said horn for receiving a caster swiveling stem, said receiver having a second axis;
a yoke-shaped opening in said top;
a means mounted on said horn and covering said yoke opening;
said horn and said covering means being made of plastic;
a plate for attachment of the caster assembly to an object to be supported by said caster assembly, said plate having a downwardly projecting stem for reception in the caster horn, the stem having a longitudinal axis and fittingly received in said receiver for enabling swiveling of the caster about the stem axis relative to the plate;
said stem being received in said receiver in the top of said horn;
an aperture in the top of said horn;
a resilient brake member fastened to said horn and having at least one distal end portion;
a swivel lock pin extending through said aperture in said top of said horn and having one end engaged with said distal end of said brake member;
a pin receiver in said plate for receiving an end of said lock pin when swivel locking is to be applied; and
said yoke covering means being a brake operating member, operable, when actuated, to move the distal end of said brake member against said lock pin to push a portion of the pin up through the top of the horn and lock in at least one of said receivers in the plate, to prevent swiveling.

10. The assembly of claim 9 and wherein:
said resilient brake member is a leaf of spring steel having a mounting tab portion affixed to said horn.

11. The assembly of claim 10 and wherein:
said stem receiver is an upwardly opening socket having a cylindrical wall with a longitudinal axis, to receive said stem and pivot about the longitudinal axis of the stem, and the socket having an inwardly projecting circular rib received in a groove in said stem and retaining the stem after snapping the rib into the groove, and the socket having a bottom hemispherical surface to receive a ball in the bottom of the socket for supporting the bottom of the stem in the horn.

12. A caster assembly comprising:
a horn;
means mounted to said horn for connection to an object to be supported by the caster assembly;
at least one wheel mounted to said horn and having an axis of rotation relative to said horn to enable the caster assembly to roll along a surface; and
a brake member having an anchor portion fixed to said horn and having a wheel contact portion operable, when actuated, to prevent rotation of said wheel;
said brake member including a spring portion between said anchor portion and said wheel contact portion, wherein;
said brake member anchor portion, spring portion and wheel contact portion are portions of an elongate piece of spring material, with the wheel contact portion remote from the anchor portion.

13. The assembly of claim 12 and further comprising:
a brake operating lever having a cam portion and a pair of pivot pins projecting along a pivot axis and in opposite directions from said cam portion;
said horn having pivot pin receivers; and
said wheel contact portion of said spring material urging said pivot pins into said receivers.

14. The assembly of claim 12 and wherein:
said means mounted to said horn for connection to an object to be supported include a swivel comprising:
a stem projecting into said horn and cooperating with said horn to establish a swivel axis; and
means on said stem engageable with the object to be supported for attachment to said object.

15. The assembly of claim 14 and wherein:
said means on said stem for attachment include a plate;
said horn has at least one swivel lock pin guide therein;
said caster assembly further comprises at least one swivel lock pin slidably received in said lock pin guide;
said brake member has a lock pin contact portion remote from said anchor portion and from said wheel contact portion; and
said plate has a plurality of swivel lock pin receivers spaced in a circle around said swivel axis.

16. The assembly of claim 15 and wherein:
said lock pin has a distal end and has a proximal end portion adjacent said lock pin contact portion of said brake member; and
said brake member is operable, when actuated to cause said lock pin contact portion to push said lock pin whereby said distal end of said lock pin is pushed into one of said lock pin receivers to prevent swiveling of said horn about said swivel axis.

17. The assembly of claim 14 and further comprising:
a brake operating lever having a cam portion and having a pivot portion and pivotally mounted to said horn at a location remote from said axis of rotation of said wheel, said cam portion engaging said brake member to actuate said brake member to prevent rotation of said wheel.

18. The assembly of claim 17 and wherein:
said cam portion engages said brake member adjacent said wheel contact portion.

19. The assembly of claim 17 and wherein:
said means on said stem for attachment includes a plate having apertures therein for reception of fasteners to fasten said plate to the object to be supported.

20. The assembly of claim 17 and wherein:
said means on said stem for attachment includes a threaded post for reception in a threaded receiver in the object to be supported.

21. The assembly of claim 17 and wherein:
said means on said stem for attachment is a post having a perimetrical groove thereon and receiving a split resilient ring in said groove for frictionally engaging a receiver in the object to be supported.

22. The assembly of claim 12 and wherein:
the anchor portion, spring portion and wheel contact portion of said brake member are portions of an elongate strip of spring material and which extends from a rear end forward and upward to a first bend region and forward from the first bend region to a front end;
said anchor portion is adjacent said first bend region and has an aperture therein receiving an anchor fixed to said horn; and
the assembly further comprises a brake operating member mounted on said horn.

23. The assembly of claim 22 and wherein:
said strip has a generally U-shaped slot therein defining said anchor portion, the slot having ends adjacent said first bend region.

24. The assembly of claim 23 and wherein:
said brake operating member has pivotal mounting to said horn with a pivot axis;
said brake operating member has a cam surface engaging said wheel contact portion of said brake member, the location of said pivot axis relative to said wheel contact portion of said brake member enabling over-center, bi-stable positioning of said brake operating member from brake release position to brake applying position; and
said spring material strip is normally disposed in elastically deformed configuration when anchored in said horn and thereby biases said brake operating member to stay in position when placed in either of said positions.

25. The assembly of claim 22 and wherein:
said means mounted to said horn for connection to an object to be supported include a plate having a stem projecting into said horn and cooperating with said horn to establish a swivel axis;
said horn has at least one swivel lock pin guide therein;
said caster assembly further comprises at least one swivel lock pin slidably received in said lock pin guide;
said brake member has a lock pin contact portion remote from said anchor portion and from said wheel contact portion; and
said plate has a plurality of swivel lock pin receivers spaced in a circle around said swivel axis; and
said strip of spring material bends upward at said front end and extends upward to an upper end providing said lock pin contact portion of said brake member.

26. The assembly of claim 25 and wherein:
said lock pin has a distal end and has a proximal end portion adjacent said upper end of said brake member; and
said brake member is operable, when actuated to cause said upper end of said spring material to push said lock pin whereby said distal end of said lock pin is pushed into one of said lock pin receivers to prevent swiveling of said horn about said swivel axis.

* * * * *